(12) United States Patent
Chen

(10) Patent No.: US 12,382,116 B2
(45) Date of Patent: Aug. 5, 2025

(54) SYSTEMS AND METHODS FOR LIGHT WEIGHT BITRATE-RESOLUTION OPTIMIZATION FOR LIVE STREAMING AND TRANSCODING

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 223 days.

(21) Appl. No.: 17/875,637

(22) Filed: Jul. 28, 2022

(65) Prior Publication Data

US 2024/0040171 A1  Feb. 1, 2024

(51) Int. Cl.
H04N 21/236 (2011.01)
H04N 21/2187 (2011.01)
H04N 21/845 (2011.01)

(52) U.S. Cl.
CPC ........... H04N 21/23611 (2013.01); H04N 21/2187 (2013.01); H04N 21/8456 (2013.01)

(58) Field of Classification Search
CPC ......... H04N 21/23611; H04N 21/2187; H04N 21/8456
See application file for complete search history.

(56) References Cited

U.S. PATENT DOCUMENTS

| | | | |
|---|---|---|---|
| 11,063,881 B1* | 7/2021 | Vijayasuganthan | .. H04L 47/748 |
| 11,206,221 B1* | 12/2021 | Guo | ....... H04L 47/527 |
| 2009/0063995 A1* | 3/2009 | Baron | ............... H04N 7/17318 715/753 |
| 2016/0134881 A1* | 5/2016 | Wang | .................. G06F 9/45558 375/240.02 |
| 2017/0289597 A1* | 10/2017 | Riedel | ............... H04N 21/2183 |
| 2017/0302981 A1 | 10/2017 | Sethuraman et al. | |
| 2018/0077420 A1* | 3/2018 | Dunham | ................ H04N 19/37 |
| 2018/0288459 A1* | 10/2018 | Ramaraj | ............ H04L 65/1069 |
| 2019/0149868 A1* | 5/2019 | Singh | ................ H04N 21/6379 709/231 |
| 2019/0180454 A1* | 6/2019 | Choudhury | .......... H04N 19/139 |
| 2019/0387237 A1* | 12/2019 | Phillips | .............. H04N 21/8456 |

(Continued)

OTHER PUBLICATIONS

Menon Vignesh V. et al., "OPSE: Online Per-Scene Encoding for Adaptive HTTP Live Streaming," in IEEE International Conference on Multimedia and Expo (ICME), pp. 1-4, Jul. 18, 2022.

(Continued)

*Primary Examiner* — Amir Shahnami
(74) *Attorney, Agent, or Firm* — Haley Guiliano LLP

(57) ABSTRACT

Systems and methods are described for transcoding at least a portion of a live media asset ingested from a media content source. The systems and methods may be configured to, in real time, after ingesting the at least a portion of the live media asset, determine parameters of the at least a portion of the live media asset. The systems and methods may be further configured to, in real time, after ingesting the at least a portion of the live media asset, determine, based on the parameters, a plurality of optimal bitrate-resolution pairs for the at least a portion of the live media asset. The systems and methods may be further configured to, in real time, after ingesting the at least a portion of the live media asset, cause the at least a portion of the live media asset to be transcoded based on the plurality of optimal bitrate-resolution pairs.

22 Claims, 8 Drawing Sheets

Illustration of Live ABR Streaming from Capture to Playing

(56) References Cited

U.S. PATENT DOCUMENTS

| | | | | |
|---|---|---|---|---|
| 2020/0128242 | A1* | 4/2020 | Aristarkhov | H04N 19/14 |
| 2022/0030309 | A1* | 1/2022 | Fano | H04N 21/84 |
| 2022/0053308 | A1* | 2/2022 | Higuchi | H04L 67/101 |
| 2022/0083391 | A1* | 3/2022 | Liu | G06F 9/5072 |
| 2022/0141476 | A1 | 5/2022 | Erfanian et al. | |
| 2022/0264168 | A1* | 8/2022 | Dahl | H04L 65/612 |
| 2022/0417467 | A1* | 12/2022 | Roeder | H04N 21/23805 |
| 2023/0116961 | A1* | 4/2023 | Braathen | G06Q 20/384 705/40 |
| 2023/0275944 | A1* | 8/2023 | Slater | H04B 7/18508 709/231 |
| 2023/0388511 | A1* | 11/2023 | Menon | H04N 19/184 |

OTHER PUBLICATIONS

Sriram Sethuraman et al., "Noniterative Content-Adaptive Distributed Encoding Through ML Techniques," SMPTE Motion Imaging Journal 127(9):50-55, Oct. 1, 2018, DOI:10.5594/JMI.2018.2862647, pp. 50-55.

Stefan Lederer et al., "Dynamic adaptive streaming over HTTP dataset," MMSys '12: Proceedings of the 3rd Multimedia Systems Conference, Jan. 1, 2012, p. 89, DOI: 10.1145/2155555.2155570.

International Search Report and Written Opinion mailed Oct. 19, 2023 in connection with PCT/US2023/028718.

Gehred, "Encode video in a smarter way using Automated ABR," AWS Media Blog (2020) (5 page) (https://aws.amazon.com/blogs/media/introducing-automated-abr-adaptive-bit-rate-configuration-a-better-way-to-encode-vod-content-using-aws-elemental-mediaconvert/).

HTTP Live Streaming (HLS) Authoring Specification for Apple Devices | Apple Developer Documentation (58 pages) (https://developer.apple.com/documentation/http_live_streaming/http_live_streaming_hls_authoring_specification_for_apple_devices).

ITU-T Recommendation P.1201.1: Parametric non-intrusive assessment of audiovisual media streaming quality—lower resolution application area (2012) (50 pages).

ITU-T Recommendation P.1201.2: Parametric non-intrusive assessment of audiovisual media streaming quality—higher resolution application area (2012) (56 pages).

ITU-T Recommendation P.1202.1: Parametric non-intrusive bitstream assessment of video media streaming quality—Lower resolution application area (2012) (62 pages).

ITU-T Recommendation P.1202.2: Parametric non-intrusive bitstream assessment of video media streaming quality—Higher resolution application area (2012) (64 pages).

Katsavounidis, "Dynamic optimizer—a perceptual video encoding optimization framework," Netflix TechBlog (2018) (24 pages) (https://netflixtechblog.com/dynamic-optimizer-a-perceptual-video-encoding-optimization-framework-e19f1e3a277f).

Katsenou et al., "Efficient Bitrate Ladder Construction for Content-Optimized Adaptive Video Streaming," IEEE Open Journal of Signal Processing, 2:496-511 (2021).

Mavlankar et al., "Optimized shot-based encodes for 4K: Now streaming!," Netflix TechBlog (2020) (18 pages) (https://netflixtechblog.com/optimized-shot-based-encodes-for-4k-now-streaming-47b516b10bbb).

Menon et al., "Efficiently Predicting Quality with ATHENA's Video Complexity Analyzer (VCA) project", Bitmovin (Mar. 25, 2022) (8 pages) (https://bitmovin.com/video-complexity-analyzer-vca/).

Netflix TechBlog, "Per-Title Encode Optimization," Dynamic optimizer—a perceptual video encoding optimization framework (2015) (15 pages) M(https://netflixtechblog.com/per-title-encode-optimization-7e99442b62a2).

Spiteri et al., "From Theory to Practice: Improving Bitrate Adaptation in the DASH Reference Player." ACM Transactions on Multimedia Computing, Communications, and Applications, 15(2s):67:1-67:29 (2019).

* cited by examiner

Central Data Center Creates ABR Renditions

Edge Servers Create ABR Renditions
Comparison of Central vs. Edge for ABR Video Encoding and Streaming Configuration in Training the Prediction Network Inference Mode
Use of Trained Prediction Network for Inference
Predicative ABR Ladder Creation of Optimal Resolution Per Bitrate for Each Video

| Content Dependent Resolution-bitrate Ladder | |
|---|---|
| Resolution 1 | Bitrate 1 |
| Resolution 2 | Bitrate 2 |
| Resolution 3 | Bitrate 3 |
| ... | ... |
| Resolution N | Bitrate N |

An Example Table of Content-Optimized Resolution-bitrate Pairs.

FIG. 4

SYSTEMS AND METHODS FOR LIGHT WEIGHT BITRATE-RESOLUTION OPTIMIZATION FOR LIVE STREAMING AND TRANSCODING

BACKGROUND

This disclosure is directed to systems and methods for transcoding media assets based on optimal bitrate-resolution pairs. In particular, such transcoding may be performed in real time after ingesting at least a portion of a live media asset.

SUMMARY

Adaptive bitrate (ABR) streaming has been widely deployed to provide high-quality video and viewer experiences. ABR streaming is responsive to user and network events and can be used in demanding scenarios, e.g., low-latency live streaming. Many service providers deploy HTTP Adaptive Streaming (HAS) through Dynamic Adaptive Streaming over HTTP (DASH), or HTTP Live Streaming (HLS).

In video streaming, there are many challenges, including the heterogeneity of network conditions, user requirements and content compression performance. To help ensure high quality of experience (QoE), videos are encoded with different resolutions and bitrates to allow for the adaptation to varying conditions, to create a set of bitrate-resolution pairs for a video, which may be referred to as an ABR ladder. In one approach, a static ABR ladder is employed for all content, referred to as a one-size-fits-all approach, in which predefined bitrate points are used regardless of content. In another approach, defined bitrate points can be differentiated based on the genre of the content, i.e., higher bitrates might be used for content with rapid motion and fast scene changes, such as sports. However, such approaches do not consider dependency of video compression performance on diverse content characteristics, and result in noticeable coding artifacts and hence in a degraded QoE in some content.

In another approach, content-optimized solutions have been developed. In such multi-objective optimization, each video gets split into short segments or chunks, and each chunk is encoded using optimized parameters, such as resolution, quantization parameters, intra-frame distance, etc. The goal is to build a Pareto frontier (PF) across all rate-distortion (RD) curves, and analyze a set of target bitrates to find the best encoded bitstreams. Such approach, which may be referred to a per-title and shot-optimized encoding, delivers higher quality video in two ways. Under low-bandwidth conditions, it often delivers better video quality as easy-to-encode content streamed at a higher resolution for the same bitrate. When the bandwidth is adequate for high bitrate encodes, it then provides even better video quality for complex titles as it would be encoded at a higher maximum bitrate than in a non-optimized, fixed-ladder production.

Given the extensive parameter space in such optimization and the need to repeat this process for each chunk, this approach requires a massive amount of computational resources. Thus, this technique has been highly expensive in terms of computational, financial and energy costs, given the need to provide different formats of content to different users at various locations using various types of devices with various connectivity and display capabilities. In addition to the complexity and cost, the extensive and iterative processing makes this approach prohibitive for deployment in the live ABR streaming applications, where there is no privilege of collecting posterior knowledge for optimizing the ladder in the live and low-latency use cases. In one approach for live ABR streaming, a fixed ladder is used, where bitrates are associated with pre-defined resolutions. However, there is a need to build a low complexity, optimized ABR ladder that is responsive in transcoding and is also practical for live ABR streaming with reduced latency.

To overcome these problems, computer-implemented systems and methods are provided herein for ingesting at least a portion of a live media asset from a media content source. The systems and methods may perform, in real time, after ingesting the live media asset determining parameters of the at least a portion of the ingested live media asset; determining, based on the parameters, a plurality of optimal bitrate-resolution pairs for the at least a portion of the live media asset; and causing the at least a portion of the live media asset to be transcoded based on the plurality of optimal bitrate-resolution pairs.

Such aspects may enable a low-complexity module to estimate video complexity and create content-based ABR ladders, to achieve optimization of live content in real time. In some embodiments, such portion(s) of the media asset may already be encoded when such portion(s) of the media asset is ingested, and the systems and methods provided herein may parse and analyze bitstream-level statistics, already available in connection with the ingested media asset. Such parsing of bitstream-level encoding data can provide sufficient information, while coming at a very low complexity cost in processing. In some embodiments, the provided systems and methods may employ a prediction network for deriving the best estimated bitrate-resolution pairs, highly adaptive and content dependent. In some embodiments, the content-optimized ABR ladder may be included as metadata in bitstreams of encoding data. Such metadata may be associated with a very small payload of optimized encoding parameters, and yet provides an effective means to improve the transcoding, e.g., transcoding at an edge server or central server. In some embodiments, the provided systems and methods may be employed in live ABR streaming and/or non-live ABR streaming, where transcoding at the edge may often occur.

In some aspects of this disclosure, the provided systems and methods may be further configured to generate a bitstream comprising metadata, the metadata including the plurality of optimal bitrate-resolution pairs. The provided systems and methods may cause the at least a portion of the live media asset to be transcoded by transmitting the bitstream from a central server to one or more edge servers. Such one or more edge servers may be configured to transcode the at least a portion of the live media asset based on the plurality of optimal bitrate-resolution pairs indicated in the metadata.

In some embodiments, the at least a portion of the live media asset is a segment of the live media asset, and the live media asset comprises a plurality of segments, and the transmitted bitstream includes a single indication of the metadata for each respective segment of the plurality of segments.

In some aspects of this disclosure, a central server performs the ingesting of the at least a portion of the live media asset from the media content source. The provided systems and methods may cause the central server to perform the transcoding of the at least a portion of the live media asset, based on the plurality of optimal bitrate-resolution pairs.

Such transcoded at least a portion of the live media asset may be transmitted to one or more edge servers and/or client devices.

In some embodiments, the provided systems and methods may be further configured to train a machine learning model using training data comprising a plurality of parameters for at least respective portions of a plurality of media assets and corresponding bitrate-resolution pairs. The trained machine learning model may be configured to accept as input the parameters of the at least a portion of the ingested live media asset and output the plurality of optimal bitrate-resolution pairs for the ingested live media asset. In some aspects of this disclosure, the parameters of the training data include an indication of a genre (e.g., action, comedy, sports, drama, documentary, or any other suitable categorization of content, or any combination thereof) for at least the respective portions of the plurality of media assets of the training data.

In some aspects of this disclosure, determining parameters of the at least a portion of the live media asset comprises extracting scene and motion statistics from a bitstream corresponding to the at least a portion of the ingested live media asset.

In some embodiments, the at least a portion of the live media asset is a segment of the live media asset, and the live media asset comprises a plurality of segments, and determining parameters of the at least a portion of the live media asset comprises determining parameters for at least one segment of the plurality of segments. In some aspects of this disclosure, the parameters include a genre of the at least a portion of the live media asset or the at least one segment thereof.

In some embodiments, the provided systems and methods may be further configured to cause the at least a portion of the live media asset to be transcoded based on the plurality of optimal bitrate-resolution pairs in response to receiving a request from a client device for the at least a portion of the ingested live media asset.

In some embodiments, the at least a portion of the live media asset, as ingested, is encoded.

In some embodiments, the at least a portion of the live media asset, as ingested, is not encoded, and the provided systems and methods may be further configured to encode the at least a portion of the ingested live media asset, and the parameters of the live media asset may be determined based at least in part on performing the encoding.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4 shows a content-dependent resolution-bitrate ladder, in accordance with some embodiments of this disclosure.

DETAILED DESCRIPTION

Figure 1:
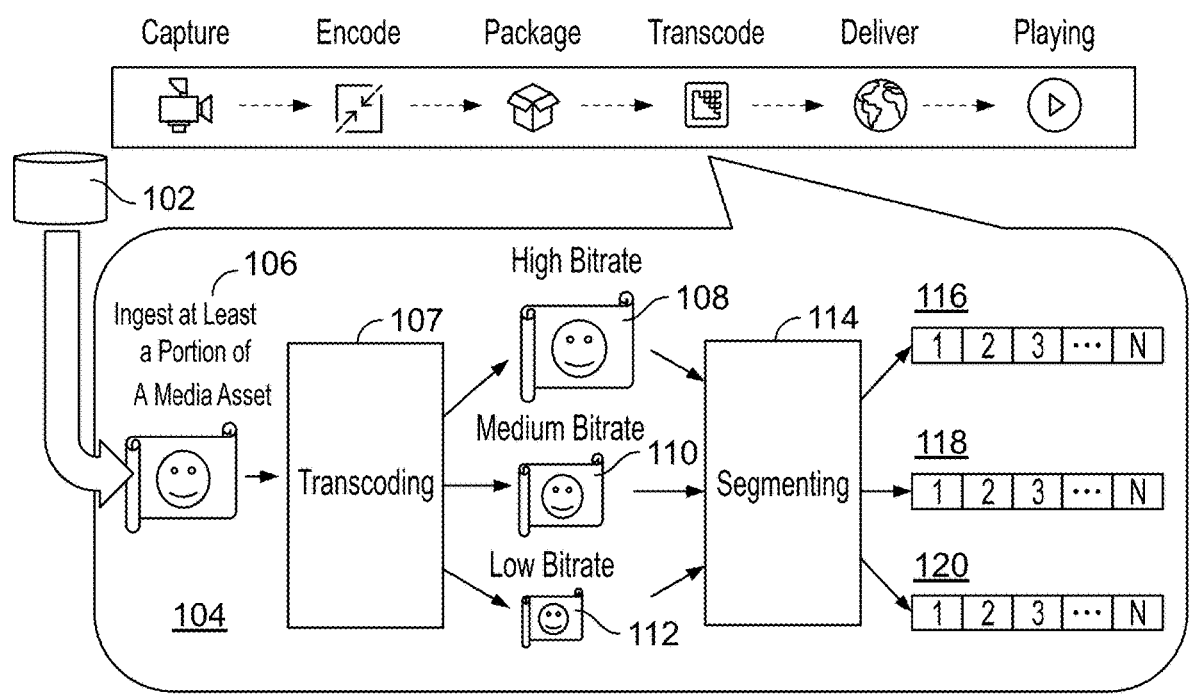
FIG. 1 shows an illustrative block diagram for transcoding at least a portion of a media asset for an ABR streaming process, in accordance with some embodiments of this disclosure.

FIG. 1 shows an illustrative block diagram 100 for transcoding at least a portion of a media asset 106 for an ABR streaming process. During a capture stage, at least a portion of a media asset 106 may be ingested by server 104, e.g., one or more of an origin server, a central server, or an edge server of a content delivery network (CDN), or by any other suitable computing device, or any combination thereof. In some embodiments, the at least a portion of a media asset 106 may include a single segment or scene or chunk or other single portion of a media asset, the entire media asset, or any suitable duration of, or number of portions of, the media asset. In some embodiments, the at least a portion of a media asset 106 may be, as ingested, encoded in a particular format, e.g., a pre-encoded media asset. Alternatively, in some embodiments, the at least a portion of a media asset 106 may be, as ingested, not encoded and/or not compressed, and thus encoding of the at least a portion of a media asset 106 may be performed after ingesting the at least a portion of a media asset 106. While a single server 104 and content source 102 are shown in FIG. 1, it should be appreciated that any suitable number of servers and content servers (and/or edge servers or any other suitable computing device) may be utilized, and computing tasks may be distributed across such respective groups of servers. In some embodiments, server 104 may be referred to, and may operate as, a central server or central data center of a CDN.

The at least a portion of media asset 106 may be received (e.g., via any suitable communication network 609 of FIG. 6 or other wireless link or a wired link) at 106 from any suitable content source 102. In some embodiments, such content source or other external source may have performed encoding on an uncompressed and/or raw version of the media asset to obtain a pre-encoded at least a portion of media asset 106. In some embodiments, content source 102 may be a repository of media assets and/or portions thereof, or the location at which a live media asset or portions thereof is created (e.g., a video feed from a sports game) or the location at which such live media asset or portions is otherwise received and further transmitted. The content sources may be collocated, or they may also reside in a variety of locations. The content from each source may be in the same format, or the content from some or all of the sources may be in any suitable other format(s). In some embodiments, server 104 may be configured to additionally or alternatively perform at least a portion of the encoding. In some embodiments, at least a portion of media asset 106 may be ingested in an unencoded and/or uncompressed format. In some embodiments, as ingested by server 104, the at least a portion of media asset 106 may be in a compressed format. In some embodiments, at least a portion of media asset 106 may include or otherwise be transmitted or associated with bitstream-level statistics (e.g., included in metadata), from which encoding parameters may be extracted, as described in further detail below.

In some embodiments, the ingested at least a portion of media asset 106 may correspond to live content. Such ingested at least a portion of media asset 106 corresponding to live content may be, for example, a high bitrate rendition of the at least a portion of media asset 106. In some embodiments, the at least a portion of media asset 106 may correspond to on-demand content. The at least a portion of media asset 106 may be received in any suitable format. An example of a format of the at least a portion of media asset 106 may be a particular bitrate (e.g., such as in kbps) at which the at least a portion of media asset 106 is to be streamed, resolution (e.g., such as, for example, 1920×1080, or any other suitable resolution, such as in pixels or voxels), frame rate, progressive or interlaced video, a video and/or audio codecs, or any combination thereof, and/or any other suitable attributes of a media asset or portions thereof may constitute a particular format.

As referred to herein, the term "media asset" should be understood to refer to an electronically consumable user assets, e.g., live content, television programming, as well as pay-per-view program, on-demand programs (as in video-on-demand (VOD) systems), Internet content (e.g., streaming content, downloadable content, webcasts, etc.), augmented reality content, virtual reality content, three-dimensional content, video clips, audio, playlists, websites, articles, electronic books, blogs, social media, applications, games, and/or any other media or multimedia, and/or combination of the above.

As referred to herein, compression and/or encoding of at least a portion of media asset 106 may be understood as performance by any suitable combination of hardware and/or software of bit reduction techniques on digital bits of the at least a portion of media asset in order to reduce the amount of storage space required to store the at least a portion of media asset. Such techniques may reduce the bandwidth or network resources required to transmit the at least a portion of media asset over a network or other suitable wireless or wired communication medium and/or enable bitrate savings with respect to downloading or uploading the media asset. Such techniques may encode the at least a portion of media asset such that the encoded media asset or encoded portion thereof may be represented with fewer digital bits than the original representation while minimizing the impact of the encoding or compression on the quality of the at least a portion of media asset. In some embodiments, the encoding of the at least a portion of media asset may employ a hybrid video coder such as, for example, the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

In some embodiments, an ABR ladder generator system may be configured to be executed at least in part at server 104 and/or at any other suitable computing device described herein (e.g., in FIGS. 1-5), to perform the techniques described above and below. In some embodiments, certain functionalities provided by the ABR ladder generator system may be provided via an Application Programming Interface (API) or software development kit (SDK). At 107, the ABR ladder generator system may be configured to perform a transcoding operation on the at least a portion of media asset 106. As used herein, "transcoding" refers to manipulating digitally compressed and coded data of at least a portion of media asset, in order to convert such data from a first format (or specification) to a second format (or specification). For example, the first format may be a first encoding format and the second format may be a second encoding format. In some embodiments, the original, uncompressed at least a portion of media asset (rather than a digitally compressed version of the at least a portion of media asset) may be available to the transcoder (e.g., implemented by the ABR ladder generator system). In such instance, "transcoding" may additionally or alternatively refer to encoding the original, uncompressed format of at least a portion of media asset into a new analog or digital format of the at least a portion of media asset. In some embodiments, transcoding may comprise re-encoding an encoded media asset or portion thereof into a different encoding format. In some embodiments, one or more of the transcoding or encoding process may be lossless or lossy.

The ABR ladder generator system may perform transcoding for any suitable purpose. For example, the ABR ladder generator system may perform transcoding at least in part to generate optimized bitrate-resolution pairs, or resolution bitrate pairs, for a particular media asset or portion(s) thereof, such as to facilitate ABR streaming, to improve a user's QoE with respect to consuming the media asset (or portion(s) thereof) over a network, even if network conditions are inconsistent. The ABR ladder generator system may employ any suitable ABR streaming technique. ABR ladder generator system may perform transcoding at least in part to generate various formats of a media asset (or portion(s) thereof), in order to accommodate varying capabilities of different types of client devices and/or particular platforms or operating systems of client devices that may request access to the media asset (or portion(s) thereof).

The ABR ladder generator system may be configured to transcode the at least a portion of media asset 106 into any suitable number of formats, such as optimized bitrate-resolution pairs, e.g., including a high bitrate format 108, a medium bitrate format 110 and a low bitrate format 112, for transmission to edge servers and/or client devices. The ABR ladder may comprise a collection of segments of different quality (e.g., based on a number of bits used to represent the media asset, or portions thereof, and/or a rate of transmission of such bits) and resolution available to be streamed to a client in a CDN, to allow for dynamic adaptation to varying conditions and different types of segments or different types of media assets. In some embodiments, the ABR ladder may be content dependent, e.g., vary based on attributes of the at least a portion of the media asset. In some embodiments, resolutions may be predefined, and optimal bitrates may be identified for such resolutions. In some embodiments, such at least a portion of the media asset transcoded based on the optimized multiple bitrate-resolution pairs may be stored at server 104 and/or edge servers in communication with server 104. In some embodiments, at 114 (which may occur during the process of transcoding at 107, or as part of a different process) the different renditions of ABR streams may be broken into segments, e.g., 2-seconds in length, or any other suitable length, which may correspond to different periods of time within the media asset runtime. For example, the ABR ladder generator system may generate segments 116 corresponding to rendition 108, segments 118 corresponding to rendition 110, and segments 120 corresponding to rendition 112. In some embodiments, the segments may be specified in advance, e.g., by a content provider, prior to transcoding.

In some embodiments, one or more servers may begin distributing the content over a network (e.g., network 609 of FIG. 6) in response to receiving a request from a client device. The format in which the content (or segments thereof) is distributed may be selected such that it is compatible with the client device's network and display capabilities. For example, such selection process may include identifying whether the client device can play or view a format and/or whether there is sufficient bandwidth between the terminal and the one or more servers to deliver the format. In some embodiments, a client device may receive a manifest file, e.g., from server 104, and use the manifest file to request segments of whichever transcoded rendition is best suited for its connectivity, display and processing power at the current time. Such variables can change midstream while the client device is playing at least a portion of the media asset, at which point the client device may detect the change and automatically request a different rendition, e.g., another step on the ABR ladder generated by the ABR ladder generator application.

As referred to herein, the term "manifest" should be understood to refer to a file and/or a data structure containing information about sequential segments (comprising sequential frames) of a media asset available to a client device. Such information may include, e.g., a number of segments in a playlist, bitrates of each segment, codecs associated with each segment, resolution of each segment, timing of each segment, location on the network where a segment may be retrieved, bandwidth of each segment, video tracks of each segment, audio tracks of each segment, subtitle tracks of each segment, captions of each segment, languages of each segment, other metadata associated with each segment, and/or any other suitable information. The manifest may be utilized in connection with any of a variety of streaming protocols employed by the ABR ladder generator system, e.g., media presentation description (MPD) files for Dynamic Adaptive Streaming over HTTP (MPEG-DASH), m3u8 files for HTTP Live Streaming (HLS), f4m files for HTTP Dynamic Streaming (HDS), ingest files for CMAF (Common Media Application Format), and/or manifest files for Microsoft Smooth Streaming (MSS), or any other suitable protocol, or any combination thereof. The manifest may be a standard manifest (e.g., an MPD file from MPEG-DASH) or may be a modified version of a standard manifest. A segment may comprise information (e.g., encoded video, audio, subtitle information, error correction bits, error detection bits, etc.) for a particular interval of a media asset, and each segment may correspond to a file specified in the manifest indicating an associated URL for retrieving the file. The segment may comprise a collection or sequence of frames (e.g., still images that together make up moving pictures of scenes of a portion of a media asset), and each segment may have a specific length (e.g., from one second to a few seconds). In some embodiments, the manifest may be an XML, file.

Figure 2A:
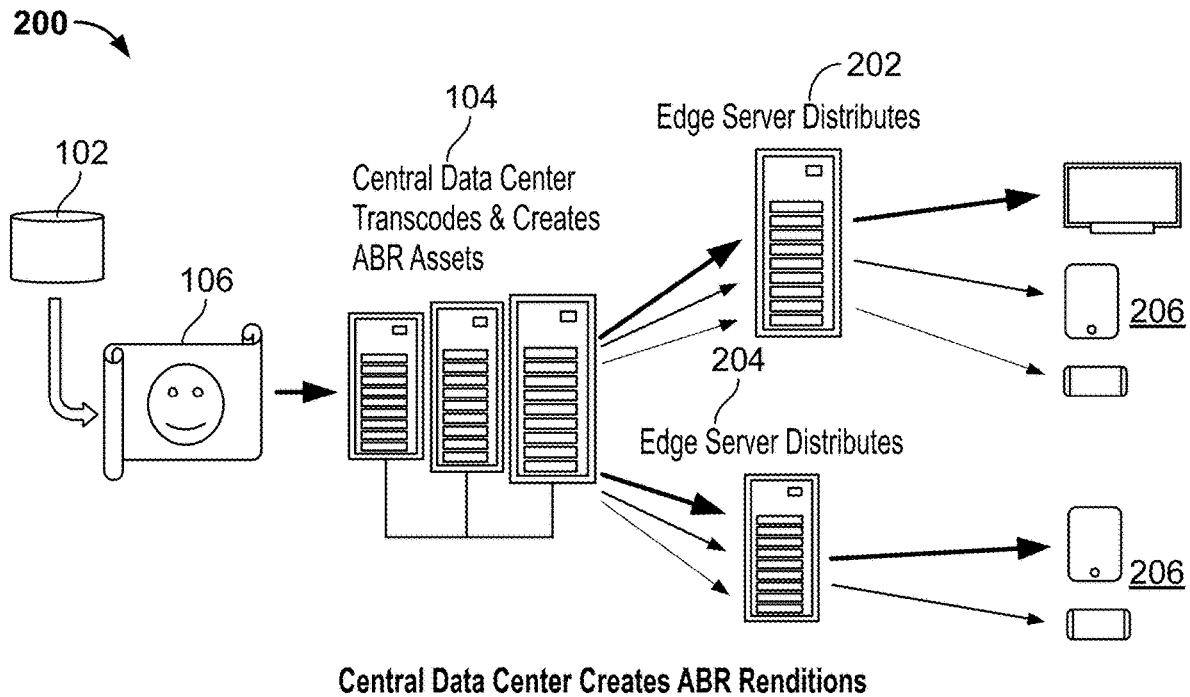
FIGS. 2A-2B show illustrative block diagrams for transcoding at least a portion of a media asset for an ABR streaming process, in accordance with some embodiments of this disclosure.
Figure 2B:
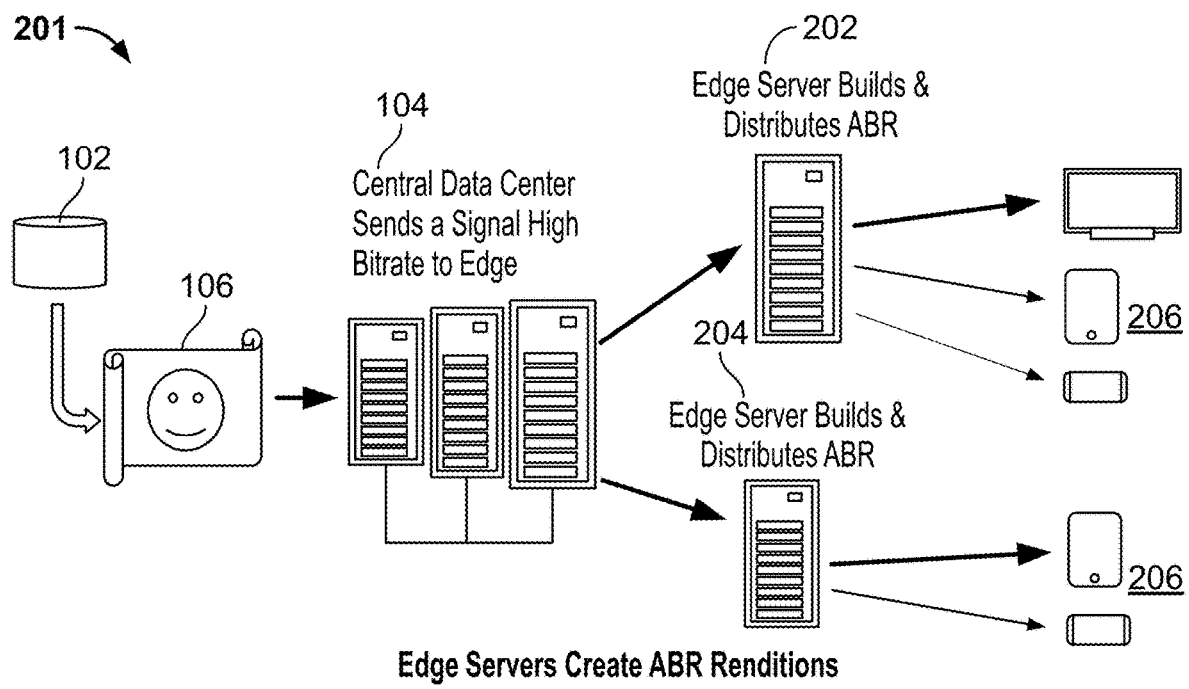

FIGS. 2A-2B show illustrative block diagrams 200, 201 for transcoding at least a portion of a media asset 106 for an ABR streaming process, in accordance with some embodiments of this disclosure. In particular, FIGS. 2A-2B show two alternatives for video encoding by the central data center and edge servers, respectively, in an expanded, scalable framework of ABR streaming configured to leverage cloud computing capabilities. As shown in FIG. 2A, the ingested at least a portion of media asset 106 may be received at server 104 (e.g., a central data center), and server 104 may perform the transcoding of ingested at least a portion of media asset 106 based on the optimized bitrate-resolution ladder for the at least a portion of the media asset 106. Such transcoded at least a portion of media asset 106 may be transmitted to any suitable number of edge servers, e.g., 202, 204, and subsequently transmitted to any suitable number of client devices upon request according to a particular ABR streaming protocol. In some embodiments, a plurality of edge servers may be strategically located at various geographic locations to optimize content delivery. In some embodiments, one or more of the edge servers may be mobile edge servers configured to provide processing support for mobile devices at various geographical regions. Each edge server may be positioned at the edge of the CDN, and may cache certain content according to certain caching strategies, to facilitate quickly providing requested content to client device(s) 206. Client device(s) 206 may correspond to any suitable device, such as, for example, a television, a mobile device (e.g., a smartphone, a tablet, a smart watch, and/or any other suitable mobile device), an Internet of Things (IoT) devices, a biometric device; a desktop computer, a laptop computer, a virtual reality (VR) device; an augmented reality (AR) device, and/or any other suitable device(s), or any combination thereof.

In some embodiments, the ABR ladder generator system may employ the arrangement shown in block diagram 201 of FIG. 2B, in which the ingested at least a portion of media asset 106 may be received at server 104 (e.g., a central data center), and server 104 may transmit a single high bitrate rendition of the at least a portion of media asset 106 to edge servers 202, 204. In some embodiments, server 104 may obtain such high bitrate rendition of the at least a portion of media asset 106 directly from content source 102, or perform encoding and/or transcoding on content received from content source 102 to obtain such high bitrate rendition of the at least a portion of media asset 106. In the example of FIG. 2B, edge server 202 and/or 204 and/or any other suitable number of edge servers may be used to perform the transcoding of the ingested at least a portion of the at least a portion of media asset 106 based on the optimized bitrate-resolution ladder for the at least a portion of media asset 106. The transcoded at least a portion of media asset 106 may be transmitted to any suitable number of client device(s) 206 upon request according to a particular ABR streaming protocol. As compared to FIG. 2A, in the arrangement of FIG. 2B, edge servers 202 and/or 204 may utilize more computing power and/or transcoding or encoding farms to perform the transcoding. On the other hand, in the arrangement of FIG. 2A, more bandwidth may be consumed to transmit multiple copies of the transcoded at least a portion of media asset 106 to edge servers 202, 204. In some embodiments, transcoding may be divided between each of server 104 and edge servers 202 and 204, or transcoding may be performed at one of server 104 or edge servers 202 and 204.

Figure 3A:
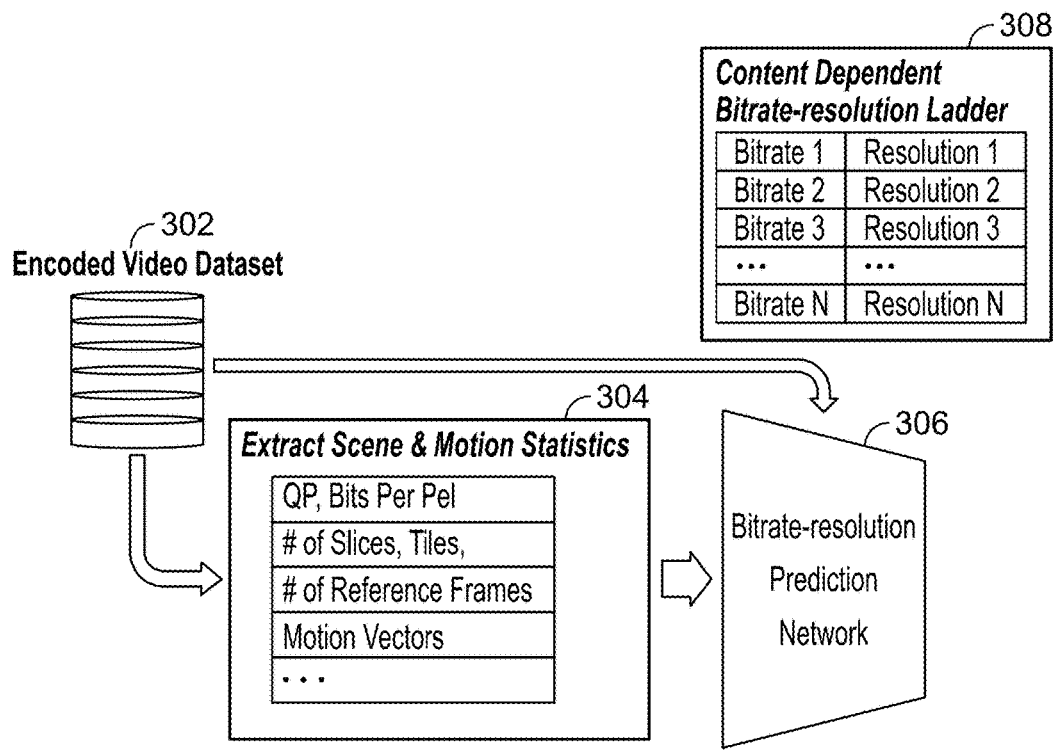
FIGS. 3A-3B show illustrative block diagrams for training a machine learning model and using the trained machine learning model to generate bitrate-resolution pairs for at least a portion of a media asset, in accordance with some embodiments of this disclosure.
Figure 3B:
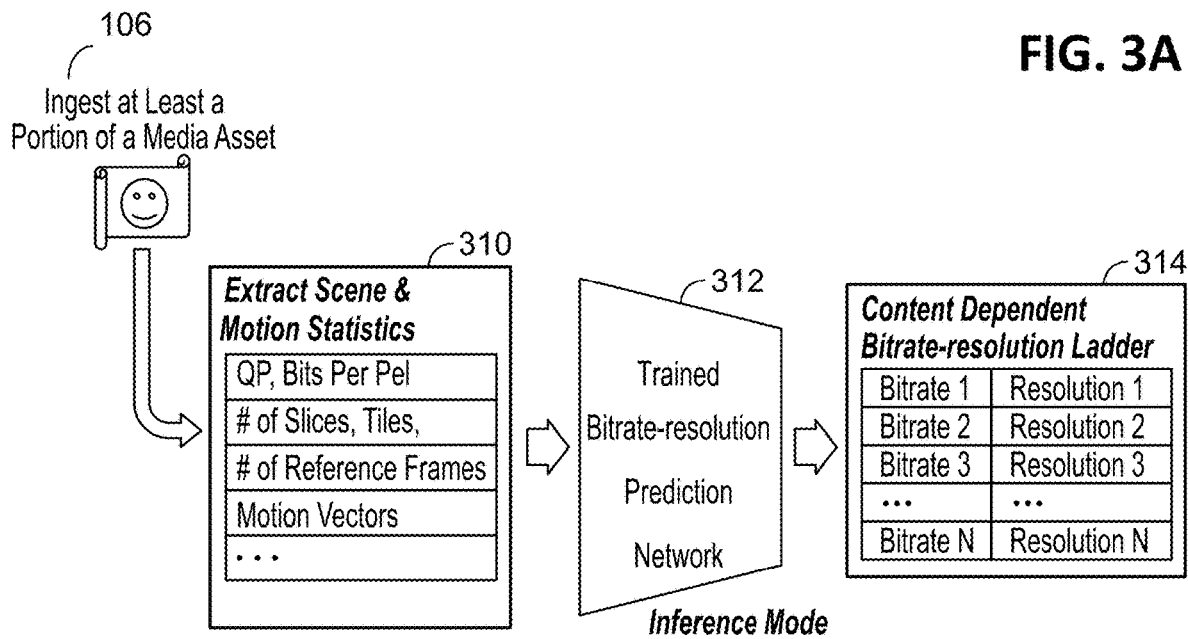

FIG. 3A-3B show illustrative block diagrams for training a machine learning model 306 and using the trained machine learning model 312 to generate content-optimized bitrate-resolution pairs 314 for at least a portion of media asset 106, in accordance with some embodiments of this disclosure. In some embodiments, machine learning model 306 may be referred to as a bitrate-resolution prediction network that may be trained to obtain trained machine learning model 312. Trained machine learning model 312 may be used for predictive ABR ladder creation of optimal resolution per bitrate for each media asset (and/or respective portion(s) thereof) associated with an input to trained machine learning model 312, to facilitate real-time adaptive bitrate transcoding of such media asset, e.g., media asset 106 or portion(s) thereof. In some embodiments, machine learning model 312 may be a neural network, or any other suitable machine learning model, or any combination thereof. While a machine learning model is described in connection with FIGS. 3A-3B, any suitable computer-implemented technique may be used for predictive ABR ladder creation of optimal resolution per bitrate for each media asset (or portion(s) thereof), e.g., heuristic-based analysis. The machine learning model may be implemented by the ABR ladder generator system at, e.g., server 104 and/or edge server 202 and/or edge server 204 and/or at content source 102, and/or at any other suitable computing device or any combination thereof.

In some embodiments, training data from encoded video dataset database 302 may be used to train machine learning model 306. In some embodiments, encoded video dataset database 302 may correspond to media content source 102 and/or server 104 and/or a database associated with server 104. In some embodiments, training data from encoded video dataset database 302 may be associated with any suitable number of media assets (or respective portions thereof) of any suitable format and characteristics and such media assets of portions thereof may be associated with various genres. In some embodiments, encoded video dataset database 302 may include a variety of genres of training content as well as a comprehensive combination of bitrates and resolutions. In some embodiments, encoded video dataset database 302 may include data associated with previously streamed live content and/or previously streamed non-live content.

The ABR ladder generator system may employ any suitable computer-implemented technique used to assess the complexity of a particular media asset (or one or more portions thereof). For example, the ABR ladder generator system may be configured to extract one or more parameters 304 for a particular media asset (or one or more portions thereof), which may be pre-encoded or otherwise encoded, and such one or more parameters 304 may be stored in association with the corresponding media asset (and/or portions thereof) in encoded video dataset database 302. In some embodiments, encoded video dataset database 302 may store the media assets (or portions thereof) themselves, data and parameters associated with the media asset, or any combination thereof. In some embodiments, a non-intrusive technique may be employed by the ABR ladder generator system, e.g., an uncompressed rendition of at least a portion of the media asset may not be needed to acquire the one or more parameters 304. Instead, the ABR ladder generator system can extract bitstream-level statistics associated with the optionally pre-encoded media assets (or portions thereof) at a low cost, and such extracted bitstream-level statistics may correspond to, or may otherwise be used to obtain, the one or more parameters 304, which may be used to estimate the complexity of an encoded video. Additionally or alternatively, the ABR ladder generator system may be configured to identify or determine parameters of the at least a portion of media asset 106 while performing, or based on performing, encoding on the at least a portion of the media asset 106, e.g., to extract parameters determined during the encoding process, for use in determining optimal bit-rate resolution pairs, such as when at least a portion of media asset 106 is ingested in an unencoded format. In some embodiments, any suitable parametric model may be implemented by the ABR ladder generator system to perform such extraction and/or assess the complexity of the media asset (or portion(s) thereof) corresponding to the one or more parameters 304. In some embodiments, the ABR ladder generator system may be configured to assess the complexity of the overall media asset, and/or assess the complexity of segments or portions of the media asset.

In some embodiments, the extracted one or more parameters 304 may be included in metadata associated with a media asset stored at database 302. In some embodiments, the one or more parameters 304 may be specified in a header associated with a bitstream of encoding data of the media asset. The ABR ladder generator system may parse and analyze the bitstream to optimize bitrate-resolution pairs for ABR streaming, e.g., by using the one or more parameters 304 extracted from the bitstream to train machine learning model 306.

In some embodiments, machine learning model 306 may be trained by way of supervised learning, e.g., with labeled training examples to help model 306 converge to an acceptable error range, e.g., to refine parameters, such as weights and/or bias values associated with layers of model 306 and/or other internal model logic, to minimize a loss function. In some embodiments, each layer may comprise one or more nodes that may be associated with learned parameters (e.g., weights and/or biases), and/or connections between nodes may represent parameters (e.g., weights and/or biases) learned during training (e.g., using backpropagation techniques, and/or any other suitable techniques). In some embodiments, the nature of the connections may enable or inhibit certain nodes of the network. In some embodiments, the ABR ladder generator system may be configured to receive (e.g., prior to training) user specification of (or automatic selection of) hyperparameters (e.g., a number of layers and/or nodes or neurons in each model). The ABR ladder generator system may automatically set or receive manual selection of a learning rate, e.g., indicating how quickly parameters should be adjusted. In some embodiments, machine learning model 306 may be trained by way of unsupervised learning, e.g., to recognize and learn patterns based on unlabeled data.

In some embodiments, in training machine learning model 306 by way of supervised learning, the training data may be suitably formatted and/or labeled (e.g., by human annotators or editors or otherwise labeled via a computer-implemented process) to indicate that, for example, particular bitrate-resolution ladder 308, corresponding to particular input training parameters 304, was previously determined to be optimal for such media asset or segments or portions thereof. As an example, such labels may be categorized metadata attributes stored in conjunction with or appended to the training parameters 304, and model 306 may be trained with such training datasets during any suitable number of training cycles. In some embodiments, input parameters 304 may include any suitable number and/or types of parameters, e.g., a quantization parameter (QP), bits per pixel, a number of slices or tiles or other regions used in encoding the at least a portion of the media asset, a number of reference frames used in encoding the at least a portion of the media asset, motion vectors used in encoding the at least a portion of the media asset, or any other suitable encoding parameter or other parameter, or any combination thereof. In some embodiments, the parameters may include an indication of a genre of a media asset, or portions thereof, and/or any other suitable characteristics, or such genre or other characteristics may otherwise be input to machine learning model 306 with parameters 304.

Any suitable network training patch size and batch size may be employed. Any suitable number of training examples may be used to train machine learning model 306, to enable machine learning model 306 to adjust its internal parameters to improve its ability to output optimal bitrate-resolution pairs 308 for given input parameters 304. Machine learning model 306 can be trained to learn patterns indicative of a relationship between certain input parameters and certain bitrate-resolution pairs for certain types of content. For example, the machine learning model may learn over time to tailor a bitrate-resolution ladder differently for different types of content (e.g., an NFL game as opposed to a cooking show) and/or for different types of devices or operating systems that may be associated with requests to access media assets (or respective portion(s) thereof). In some embodiments, the training data may correspond at least in part to a historical instance of a particular bitrate-resolution ladder used for a particular type of content. In some embodiments, the parameters input to the machine learning model 306 for training, and input to trained machine learning model 312, may be encoded as a vector, and/or preprocessed (e.g., normalized) to facilitate input to the machine learning model.

In some embodiments, machine learning model 306 may be trained at an initial training stage, e.g., offline. In some embodiments, machine learning model 306 may continue to be trained on the fly or may be adjusted on the fly for continuous improvement, based on input data and inferences or patterns drawn from the input data, and/or based on comparisons after a particular number of cycles. In some embodiments, machine learning model 306 may be trained to continuously improve with respect to certain types, formats or genres of content.

FIG. 3B shows an illustrative block diagram for using the trained machine learning model 312, to generate bitrate-resolution pairs 314 for at least a portion of media asset 106, in accordance with some embodiments of this disclosure. Trained machine learning model 312 may be used for inferring an optimal ABR bitrate-resolution ladder 314 for particular input parameters 310 associated with at least a portion of ingested media asset 106. In the example of FIG. 3B, after ingesting at least a portion of media asset 106 and/or after receiving a request from a client device to access at least a portion of media asset 106, the ABR ladder generator system may determine parameters associated with the media asset or portion(s) thereof. For example, the ABR ladder generator system may extract one or more parameters 310 from a bitstream associated with encoding data of at least a portion of media asset 106. For example, the ABR ladder generator system may extract, in real time, scene and motion statistics such as, for example, a quantization parameter (QP), bits per pixel, a number of slices or tiles or other regions used in encoding at least a portion of the media asset, a number of reference frames used in encoding at least a portion of the media asset, motion vectors used in encoding at least a portion of the media asset, or any other suitable encoding parameter or other parameter, or any combination thereof. In some embodiments, the parameters 310 may be extracted from metadata included in a bitstream corresponding to at least a portion of the media asset 106. In some embodiments, the parameters 310 may be extracted from metadata in response to ingesting, or in response to encoding, at least a portion of the media asset 106. In some embodiments, the parameters 310 may include an indication of a genre of a media asset, or portions thereof, and/or any other suitable characteristics, or such genre or other characteristics may otherwise be input to machine learning model 306 with parameters 310. In some embodiments, the ABR ladder generator system may preprocess the parameters to be input to the trained machine learning model, to cause a format of parameters input to trained model 312 to match the formatting of the training data, or any other suitable processing, or any combination thereof.

Trained machine learning model 312 may receive as input the one or more parameters 310, and may be configured to output an optimal bitrate-resolution ladder 314 for at least a portion of media asset 106 based on real-time processing of such input parameters. For example, such optimal bitrate-resolution ladder 314 may be output for one or more segments of at least a portion of media asset 106, which may be live content, while such content is being played at client devices in real time.

In some embodiments, trained model 312 may be implemented, e.g., in the examples of FIG. 1 and FIGS. 2A-2B, by server 104 and/or one or more of edge servers 202 and 204, to create and optimize the ABR ladder for each video and facilitate the transcoding procedure described above. Thus, optimal bitrate-resolution ladder 314 output by trained machine learning model 312 may be provided to server 104 and/or edge servers 202 or 204 for use in transcoding ingested at least a portion of media asset 106 in real time, e.g., after, or in response to, each request to view a media asset or portions thereof and/or during playing of portions thereof. For example, such content-optimized ladder 314 can be leveraged and included as metadata (e.g., in a bitstream associated with encoding data for at least a portion of media asset 106) for downstream transcoding at edge server 202 and/or 204, e.g., content-optimized ladder 314 may be applicable to both live and non-live streaming and VOD content. For example, if storage limitations are a concern, transcoding may be performed at the edge, which may be useful for applying the aforementioned techniques to non-live content.

When such bitrate-resolution pairs 314 have been optimized, the bitrate-resolution pairs 314 can be included and transmitted in metadata that may be included in encoding data for at least a portion of media asset 106 and/or bitstreams associated with at least a portion of media asset 106 (e.g., in video elementary stream, in multiplexed streams, in the manifest, etc.). Such metadata may be a very small payload, while providing a large benefit for downstream transcoding from a high bitrate to a lower target, which can leverage such prior knowledge. In other words, content-optimized ladder 314 may thus be made readily available from upstream production. In some embodiments, such metadata may be a compact form of optimized encoding parameters when one desires to reproduce a lower bitrate bitstream from transcoding a higher bitrate version. In some embodiments, such metadata may be transmitted only once per chunk or segment or other portion of media asset 106, e.g., ABR ladder 314 may be extracted from a first I-frame or IDR frame of a target segment that is subject to transcoding.

In some embodiments, the aforementioned techniques may help alleviate the burden of storing an entire ABR ladder on edge or regional servers, e.g., in non-live streaming and/or live streaming use cases. This may be the case particularly with content that is less popular, or is likely to be less popular, in viewing based on collected user statistics. For example, for such content, it may be viable to just keep a high bitrate version and enable responsive transcoding to deliver what a user requests. The optimized table of bitrate-resolution pairs 314 can be leveraged in such transcoding, e.g., at edge servers 202, 204. The payload of such data may consume minimal computing and/or networking resources while at the same time serving as an effective means to ensure the highest possible picture resolution selected at a given bitrate.

The systems and methods described herein may be applied to any suitable type of content. For example, the systems and methods described herein may be used to perform compression of a higher data rate of volumetric video, the attribute or texture in video-based point cloud compression, or for any other suitable content, or any combination thereof, in applications of varying network conditions and diverse user requirements.

FIG. 4 shows a content dependent resolution-bitrate ladder 400, in accordance with some embodiments of this disclosure. While FIGS. 3A-3B show that the target of optimization may be intended for bitrate-resolution pairs 308 and 314, it should be appreciated that the target of optimization may be intended for resolution-bitrate pairs 400. For example, machine learning model 306 may also be configured and trained to derive the optimal bitrates for each possible resolution. For instance, the target of training and output of inference processes may then be a table of resolution-bitrate pairs, as shown in FIG. 4. In some embodiments, once optimized, such tables can be used together by the ABR ladder generator system to derive the optimal choices for transcoding, and subsequent delivery of the optimal quality for target users. In some embodiments, providing the at least a portion of the media asset may comprise receiving a user specification of an expected resolution, or the network condition may be automatically detected, and an appropriate segment may be delivered to the client device. The transcoded renditions of the at least a portion of media asset 106 or portions thereof may be stored, and/or transmitted via a bitstream and by way of central server 104 and/or edge servers 202 and 204, for display at a client device(s) 206. Such receiving client device(s) 206 may decode the renditions of media asset 106 or portions thereof and generate at least a portion of media asset 106 for display.

Figure 5:
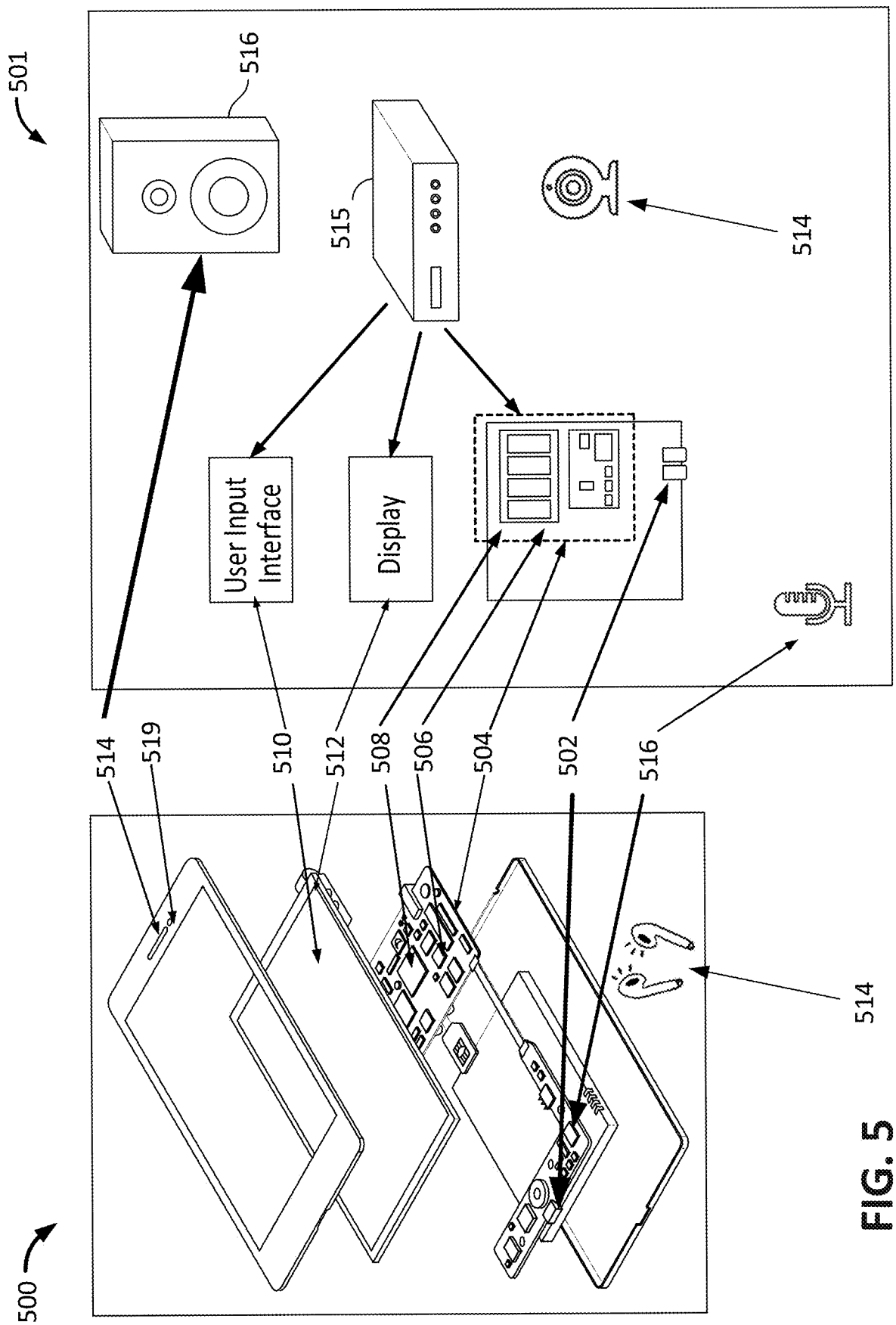
FIG. 5 shows illustrative devices, in accordance with some embodiments of this disclosure.
Figure 6:
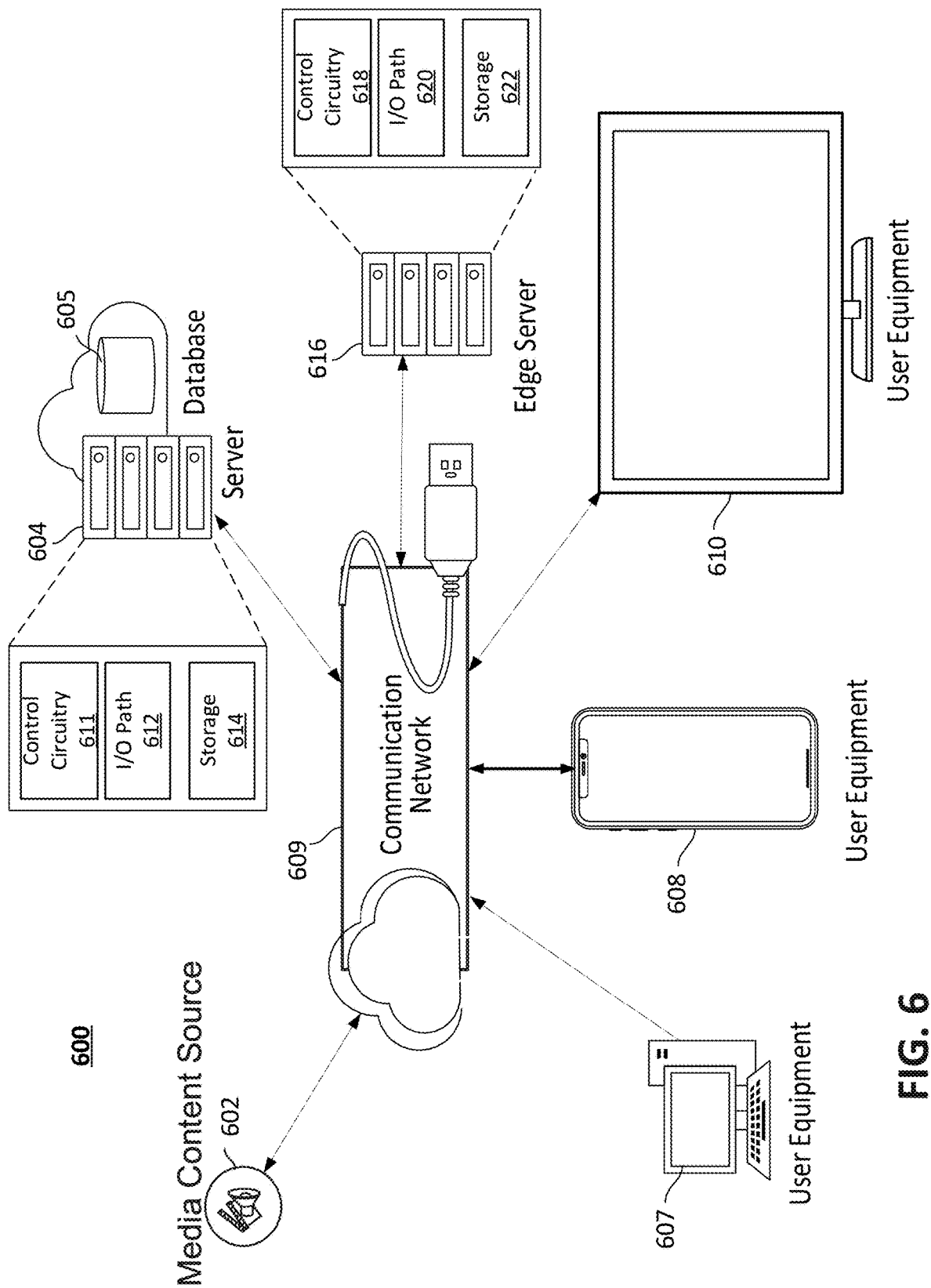
FIG. 6 shows illustrative systems, in accordance with some embodiments of this disclosure.

FIGS. 5-6 describe illustrative devices, systems, servers, and related hardware for transcoding at least a portion of a media asset for an ABR streaming process, in accordance with some embodiments of this disclosure. In some embodiments, the ABR ladder generator system may comprise each of the network-connected computing servers, devices, and/or databases shown in FIGS. 5-6, or any combination thereof, and/or any other suitable computing servers or devices or databases may be included as part of the ABR ladder generator system. FIG. 5 shows generalized embodiments of illustrative user equipment devices 500 and 501, which may correspond to, e.g., client devices 206 of FIG. 2. For example, user equipment device 500 may be a smartphone device, a tablet or any other suitable device capable of requesting and obtaining one or more portions of a media asset over a network, communicating with servers 102, 104, 202, 204, 302 or otherwise interfacing with the ABR ladder generator system described herein. In another example, user equipment device 501 may be a user television equipment system or device. User equipment device 501 may include set-top box 515. Set-top box 515 may be communicatively connected to microphone 516, audio output equipment (e.g., speaker or headphones 514), and display 512. In some embodiments, microphone 516 may receive audio corresponding to a voice of a user, e.g., a voice input or a voice command. In some embodiments, display 512 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of devices are discussed below in connection with FIG. 6. In some embodiments, device 500 may comprise any suitable number of sensors (e.g., gyroscope or gyrometer, or accelerometer, etc.), as well as a GPS module (e.g., in communication with one or more servers and/or cell towers and/or satellites) or any other suitable localization technique, to ascertain a location of user equipment device 500. In some embodiments, user equipment device 500 comprises a rechargeable battery that is configured to provide power to the components of the device.

Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., user equipment device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the ABR ladder generator system stored in memory (e.g., storage 508). Specifically, control circuitry 504 may be instructed by the ABR ladder generator system to perform the functions discussed above and below. In some implementations, processing or actions performed by control circuitry 504 may be based on instructions received from the ABR ladder generator system.

In client/server-based embodiments, control circuitry 504 may include communications circuitry suitable for communicating with a server or other networks or servers. The ABR ladder generator system may be a stand-alone application implemented on a device or a server. The ABR ladder generator system may be implemented as software or a set of executable instructions. The instructions for performing any of the embodiments discussed herein of the ABR ladder generator system may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a user equipment device 500.

In some embodiments, the ABR ladder generator system may be a client/server application where only the client application resides on user equipment device 500, and a server application resides on an external server (e.g., server 604 of FIG. 6 and/or media content source 602 of FIG. 6 and/or edge server 616 of FIG. 6, which may respectively correspond to server 102, server 104 and edge servers 202, 204 of FIGS. 1-3). In some embodiments, database 605 may be a network database storing an encoded video datasets for training machine learning model 306 and/or media assets (or portions thereof) and associated data (e.g., one or more parameters 304 of FIG. 3) and/or optimized bit-rate resolution ladders output by trained machine learning model 312. For example, the ABR ladder generator system may be implemented partially as a client application on control circuitry 504 of user equipment device 500 and partially an external server (e.g., server 604 of FIG. 6 and/or media content source 602 of FIG. 6 and/or edge server 616 of FIG. 6) as a server application running on control circuitry 611. Such external server may be a part of a local area network with one or more of user equipment devices 500, 501 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 604 of FIG. 6 and/or media content source 602 of FIG. 6 and/or edge server 616 of FIG. 6), referred to as "the cloud." User equipment device 500 may be a cloud client that relies on the cloud computing capabilities from the cloud to determine whether processing should be offloaded and facilitate such offloading. When executed by control circuitry 504 or 611, the ABR ladder generator system may instruct control circuitry 504 or 611 to perform processing tasks for selecting a particular device and/or network to obtain a particular media asset or segment thereof. The client application may instruct control circuitry 504 to perform processing tasks for selecting a particular device and/or network to obtain a particular media asset or segment thereof.

Control circuitry 504 may include communications circuitry suitable for communicating with a server, social network service, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of devices, or communication of devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as ABR ladder generator system data described above and below. Nonvolatile memory may also be used (e.g., to launch a boot-up routine and other instructions). Cloud-based storage may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment device 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of user equipment device 500 and user equipment device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters, terms, phrases, alphanumeric characters, words, etc. that are received by the microphone and converted to text by control circuitry 504. In a further example, a user may use voice commands that are received by a microphone and recognized by control circuitry 504. Camera 518 may be any suitable camera integrated with the equipment or externally connected and capable of capturing still and moving images. In some embodiments, camera 518 may be a digital camera comprising a charge-coupled device (CCD) and/or a complementary metal-oxide semiconductor (CMOS) image sensor. In some embodiments, camera 518 may be an analog camera that converts to digital images via a video card.

The ABR ladder generator system may be implemented using any suitable architecture. For example, it may be a stand-alone application wholly-implemented on each one of device 500 and device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide the functionality of the ABR ladder generator system discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, participation data from an ABR ladder generator system. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the ABR ladder generator system is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on user equipment device 500. This way, the processing of the instructions may be performed remotely by the server while the resulting displays (e.g., that may include text, a keyboard, or other visuals) are provided locally on user equipment device 500. User equipment device 500 may receive inputs from the user via input interface 510 and transmit those inputs to the remote server for processing and generating the corresponding displays. For example, user equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display may then be transmitted to user equipment device 500 for presentation to the user.

In some embodiments, the ABR ladder generator system may be downloaded and interpreted or otherwise run by an interpreter or virtual machine (run by control circuitry 504). In some embodiments, the ABR ladder generator system may be encoded in the ETV Binary Interchange Format (EBIF), received by control circuitry 504 as part of a suitable feed, and interpreted by a user agent running on control circuitry 504. For example, the ABR ladder generator system may be an EBIF application. In some embodiments, the ABR ladder generator system may be defined by a series of JAVA-based files that are received and run by a local virtual machine or other suitable middleware executed by control circuitry 504. In some of such embodiments (e.g., those employing MPEG-2 or other digital media encoding schemes), the ABR ladder generator system may be, for example, encoded and transmitted in an MPEG-2 object carousel with the MPEG audio and video packets of a program.

FIG. 6 is a diagram of an illustrative system 600, in accordance with some embodiments of this disclosure. System 600 may comprise one or more of user equipment devices 607, 608, 610 (and/or any other suitable number of user equipment devices), media content source 602, server 604, database 605, edge server 616, and/or any other suitable computing devices, or any combination thereof, which may be coupled to one or more networks, e.g., communication network 609. In some embodiments, at least a portion of such devices may correspond to user equipment device 500 or user equipment device 501 of FIG. 5, or may include any suitable portion of the same or similar components as described in connection with FIG. 5. Communication network 606 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The devices may also communicate with each other directly through an indirect path via communication network 606.

System 600 may comprise one or more media content sources 602 and one or more servers 604. In some embodiments, content source 102 may correspond to one or more of media content source 602 or server 604. Communications with media content source 602 and server 604 may be exchanged over one or more communications paths but are shown as a single path in FIG. 6 to avoid overcomplicating the drawing. In addition, there may be more than one of each of media content source 602 and server 604, but only one of each is shown in FIG. 6 to avoid overcomplicating the drawing. If desired, media content source 602 and server 604 may be integrated as one source device. In some embodiments, the ABR ladder generator system may be executed at one or more of control circuitry 611 of server 604 (and/or control circuitry of user equipment devices 607, 608, 610, or control circuitry 618 of edge server 616, or any other suitable devices, or any combination thereof). In some embodiments, any suitable data structure or any combination thereof, may be stored at database 605 maintained at or otherwise associated with server 604, and/or at storage of one or more of user equipment devices 607, 608, 610 and/or edge server 616, at least one of which may be configured to host or be in communication with database 605. User equipment device 610 may be a smart television, user equipment device 607 may be user computer equipment, and user equipment device 608 may be a wireless user communication device, each of which may be configured to include some or all of the features of the ABR ladder generator system described herein. In some embodiments, the ABR ladder generator system may be tailored to the capabilities of the particular device. In some embodiments, the ABR ladder generator system may facilitate the retrieval and presentation of media assets (and/or portions thereof), and/or may operate in conjunction with a media application (e.g., associated with content source 102) which may present media assets (and/or portions thereof), to a user.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide media consumption data, social networking data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths. I/O path 612 may comprise I/O circuitry.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an ABR ladder generator system stored in memory (e.g., the storage 614). Memory may be an electronic storage device provided as storage 614 that is part of control circuitry 611.

User equipment device 610 may be a smart television, user equipment device 607 may be user computer equipment, and user equipment device 608 may be a wireless user communication device, each of which may be configured to include some or all of the features of the ABR ladder generator system described herein. The ABR ladder generator system may be tailored to the capabilities of the particular device.

Edge server 616 may comprise control circuitry 618, I/O path 620 and storage 622, which may be implemented in a similar manner as control circuitry 611, I/O path 612 and storage 614, respectively of server 604. Edge server 616 may correspond to edge server 202 or 204 of FIG. 2. Edge server 616 may be configured to be in communication with one or more of user equipment devices 607, 608, 610 and server 604 and media content source 602 over communication network 609, and may be configured to perform processing tasks in connection with the ABR ladder generator system. In some embodiments, a plurality of edge servers may be strategically located at various geographic locations to optimize content delivery. In some embodiments, one or more of the edge servers may be mobile edge servers configured to provide processing support for mobile devices at various geographical regions. Each edge server may be positioned at the edge of the CDN, and may cache certain content according to certain caching strategies, to facilitate quickly providing requested content to client device(s) 206.

Media content source 602, server 604 or edge server 616, or any combination thereof, may include an encoder and/or a transcoder. Such encoder may comprise any suitable combination of hardware and/or software configured to process data to reduce storage space required to store the data and/or bandwidth required to transmit the image data, while minimizing the impact of the encoding on the quality of media assets (or one or more portions thereof) being encoded. The transcoder may comprise any suitable combination of hardware and/or software configured to manipulate digitally compressed and coded data of a media asset (or one or more portions thereof), in order to convert such data from a first format (or specification) to a second format (or specification). In some embodiments, the transcoder and encoder may be combined, e.g., such combination may access and encode an original, uncompressed at least a portion of a media asset (rather than a digitally compressed version of the media asset or portion(s) thereof) as well as transcode such encoded media assets, or portion(s) thereof, to various other formats.

Figure 7:
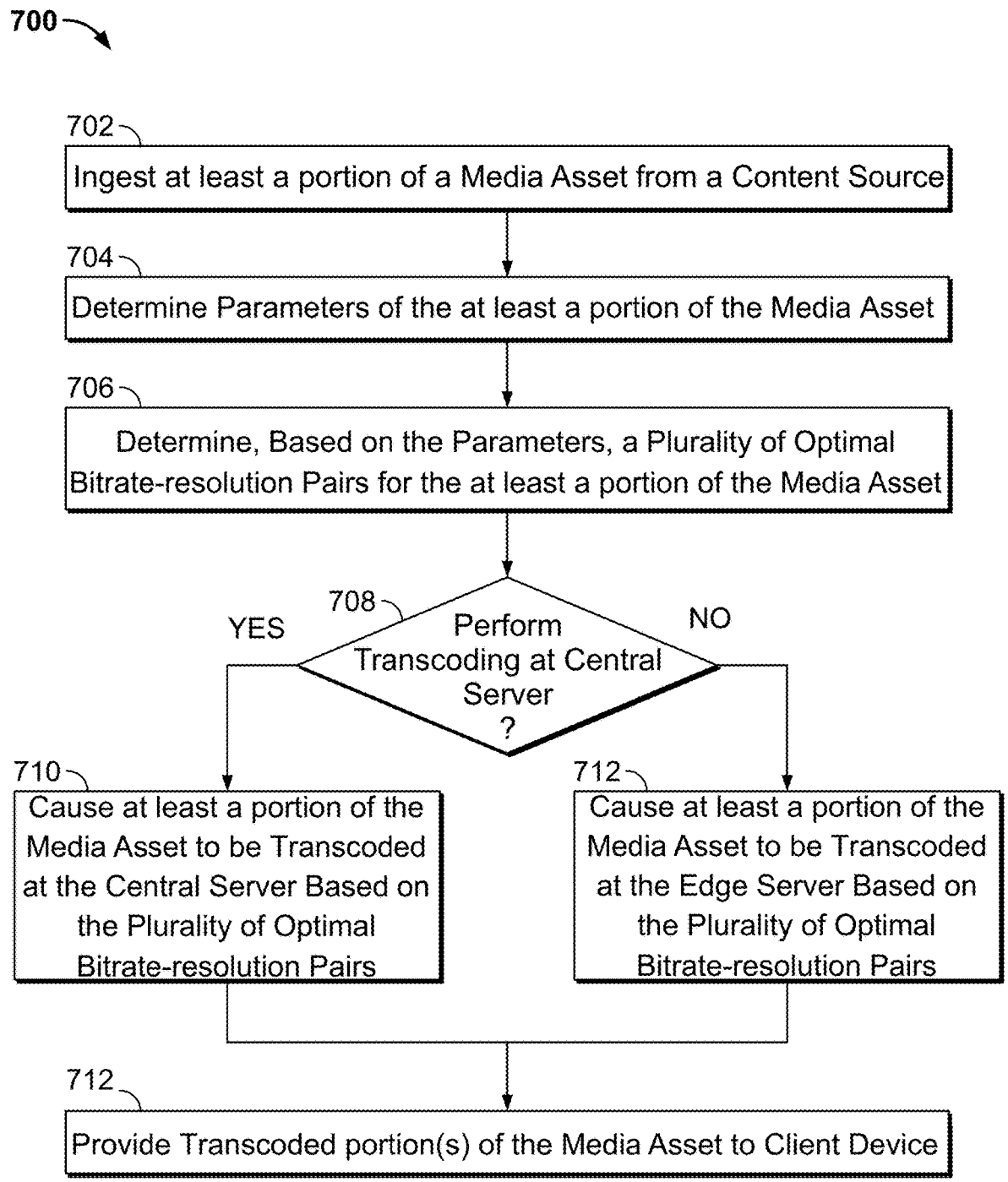
FIG. 7 is a flowchart of a detailed illustrative process for transcoding at least a portion of a media asset for an ABR streaming process, in accordance with some embodiments of this disclosure.

FIG. 7 is a flowchart of a detailed illustrative process 700 for transcoding at least a portion of a media asset for an ABR streaming process, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At 702, the ABR ladder generator system may be configured to ingest at least a portion of a media asset from a content source. For example, server 104 may ingest at least a portion of a media asset (e.g., at least a portion of media asset 106 of FIG. 1) from a content source (e.g., content source 102 of FIG. 1). In some embodiments, such at least a portion of the media asset may correspond to live content. In some embodiments, at least a portion of the media asset may be a non-live media asset, e.g., VOD content. In some embodiments, at least a portion of the media asset may have been encoded at, and transmitted to server 104 from, content source 102. For example, the ABR ladder generator system may access at least a portion of the media asset over a network (e.g., communication network 609 of FIG. 6 or any other suitable network) or any suitable wireless or wired communication path from any suitable source (e.g., media content source 602 of FIG. 6). In some embodiments, the ABR ladder generator system may generate at least a portion of the media asset, and/or retrieve at least a portion of the media asset from memory (e.g., memory or storage 614 or database 605, or any other suitable data store, or any combination thereof) and/or receive at least a portion of the media asset over any suitable data interface. Alternatively, the ABR ladder generator system may ingest the at least a portion of the media asset in an uncompressed format. In some embodiments, steps 704-712, or any suitable number of steps thereof, may be performed in response to ingesting at least a portion of the media asset, and/or in response to encoding at least a portion of the media asset, and/or in response to receiving a request for at least a portion of the media asset.

At 704, the ABR ladder generator system may determine parameters of at least a portion of the media asset. For example, if the at least a portion of the media asset is ingested in a pre-encoded format, the ABR ladder generator system may determine that such pre-encoded at least a portion of the media asset includes or otherwise is transmitted or associated with bitstream-level statistics (e.g., included in metadata). The ABR ladder generator system may be configured to extract parameters from such bitstream-level statistics, which may be, e.g., scene and motion statistics for the media asset or portions thereof. Alternatively, if the ABR ladder generator system ingests the at least a portion of the media asset in an uncompressed format, the ABR ladder generator system may be configured to encode the ingested media asset or portion(s) thereof into a particular format. In such instance, based on the encoding of the or portion(s) thereof, and/or while encoding the media asset or portion(s) thereof, the ABR ladder generator system may be configured to glean bitstream-level statistics and/or parameters. For example, the ABR ladder generator system may derive spatial and temporal complexities or parameters based on performing the encoding process.

In some embodiments, any suitable parameters may be obtained from encoding data (as ingested, or as generated, by the ABR ladder generator system). For example, such parameters may include any suitable number and/or types of parameters, e.g., a quantization parameter (QP), bits per pixel, a number of slices or tiles or other regions used in encoding at least a portion of the media asset, a number of reference frames used in encoding at least a portion of the media asset, motion vectors used in encoding at least a portion of the media asset, or any other suitable encoding parameter or other parameter, or any combination thereof. In some embodiments, the parameters may include an indication of a genre of a media asset, or portions thereof, and/or any other suitable characteristics. In some embodiments, the ABR ladder generator system may determine a complexity of the media asset, and/or a complexity of the portions thereof, based on the extracted parameters, and/or using any suitable techniques, e.g., a parametric model.

At 706, the ABR ladder generator system may determine, based on the parameters determined at 704, a plurality of optimal bitrate-resolution pairs for at least a portion of the media asset or portions or segments thereof. In some embodiments, the ABR ladder generator system may perform the determination of 706 using a machine learning model (e.g., trained machine learning model 312) as described in more detail in FIG. 3B. In some embodiments, the determined plurality of optimal bitrate-resolution pairs (e.g., shown at 314 of FIG. 3) may be content dependent, e.g., optimized for the particular type (e.g., genre and/or color and/or amount of motion and/or any other suitable characteristics) of the media asset or segments thereof. Additionally or alternatively, the ABR ladder generator system may determine, based on the parameters determined at 704, a plurality of optimal resolution-bitrate pairs for the at least a portion of the media asset or segments thereof.

At 708, the ABR ladder generator system may determine whether transcoding of at least a portion of the media asset (e.g., at least a portion of media asset 106 of FIG. 1), based on the bitrate-resolution pairs determined at 708, should be performed at a central server (e.g., central server 104 of FIG. 1 or server 604 of FIG. 6) or at one or more edge servers (e.g., edge servers 202, 204 of FIG. 2 which may correspond to edge server 616 of FIG. 6). In some embodiments, the determination at 708 whether to perform transcoding at server 104 (FIG. 2A) or to distribute the transcoding operation to edge servers 202 and/or 204 (FIG. 2B) may be based on any suitable factors or combination thereof. For example, such determination may take into account computing capabilities of central server 104 and/or edge servers 202 or 204, a current processing load of central server 104 and/or edge servers 202 or 204, current bandwidth or network conditions or demands or capabilities associated with central server 104 and/or edge servers 202 or 204, demand for certain media assets (or portions thereof) at certain locations, or any other suitable factors, or any combination thereof.

For example, as compared to the example of FIG. 2A, in the arrangement of FIG. 2B, edge servers 202 and/or 204 may utilize more computing power and/or transcoding or encoding farms to perform the transcoding. On the other hand, in the arrangement of FIG. 2A, more bandwidth may be consumed to transmit multiple copies of the transcoded at least a portion of the media asset to edge servers 202, 204. Thus, the ABR ladder generator system may perform the determination at 708 to most efficiently allocate available computing and network resources for the transcoding and delivery of content. In some embodiments, transcoding may be divided between each of server 104 and edge servers 202 and 204, or transcoding may be performed at one of server 104 or edge servers 202 and 204.

In some embodiments, the ABR ladder generator system may determine to transcode live media content in response to user requests for content, or in anticipation of one or more user requests for content. For example, the ABR ladder generator system may be configured to access, and/or perform processing on, output or transmit transcoded media asset (or portions thereof) information and/or indications of optimal bitrate-resolution pairs in response to receiving a user input or a user request, e.g., via user input interface and/or I/O circuitry of user equipment device 607, 608, or 610 of FIG. 6.

At 710, the ABR ladder generator system may cause at least a portion of the media asset to be transcoded at the central server based on the plurality of optimal bitrate-resolution pairs. For example, server 604 may be configured to use the bitrate-resolution pairs determined at 706 to guide the transcoding operation, e.g., transcode the media asset and/or segments thereof into various quality and resolution levels suitable for the particular type of content and/or various devices that may request the content. The transcoding operation may be used to obtain any suitable number of different formats for various segments of the media asset. In some embodiments, the central server may distribute the transcoded portions of at least a portion of the media asset to edge servers (e.g., edge servers 202 and/or 204 of FIG. 2) for distribution to client devices (e.g., client devices 206 of FIG. 2). In some embodiments, the central server (e.g., server 604) may store (e.g., in memory or storage 614 of FIG. 6) the bitrate-resolution pairs determined at 706.

At 712, the ABR ladder generator system may cause the at least a portion of the media asset to be transcoded at the edge server. For example, the ABR ladder generator system may cause the central server (e.g., server 604 of FIG. 6) to transmit to the edge server (e.g., edge server 616 of FIG. 6) metadata comprising an indication of the optimal bitrate-resolution pairs determined at 706, which the edge server may use to guide the transcoding of the media asset (or portions thereof) into various bitrate-resolution formats, and/or any other suitable number or types of formats. In some embodiments, the central server may transmit data representing a single high bitrate rendition of the media asset (or portions thereof) to the edge server(s), along with the metadata or otherwise associated with the metadata. For example, the edge server (or any other suitable computing device) may receive and detect the carriage and use of metadata in a bitstream (e.g., associated with at least a portion of a media asset 106). Such metadata may indicate to the edge server (or any other suitable computing device) the availability of optimized bitrate-resolution pairs (e.g., indicated at 314 of FIG. 3) to guide the transcoding. Such metadata in bitstreams may constitute a very small payload usable to optimize the transcoding of at least a portion of the media asset (and/or one or more portions thereof) while providing an effective means to improve the transcoding at the edge (or other suitable computing device). In some embodiments, the edge server (e.g., edge server 616) may store (e.g., in memory or storage 622 of FIG. 6) the bitrate-resolution pairs determined at 706.

At 714, the ABR ladder generator system may provide the transcoded portion(s) media asset to client devices. For example, client devices (e.g., client devices 206 of FIG. 2) may utilize a manifest file to request segments of the media asset, as appropriate for the client device type, device capabilities, network conditions and attributes of the current segment of the media asset. In some embodiments, the plurality of bitrate-resolution pairs may be indicated in the manifest file. Based on receiving the request, the ABR ladder generator system may transmit the requested media asset or portions thereof to the requesting client device, which may be configured to decode, and generate for display, the received media asset or portions thereof, and request further segments based on the optimized bitrate-resolution pairs.

Figure 8:
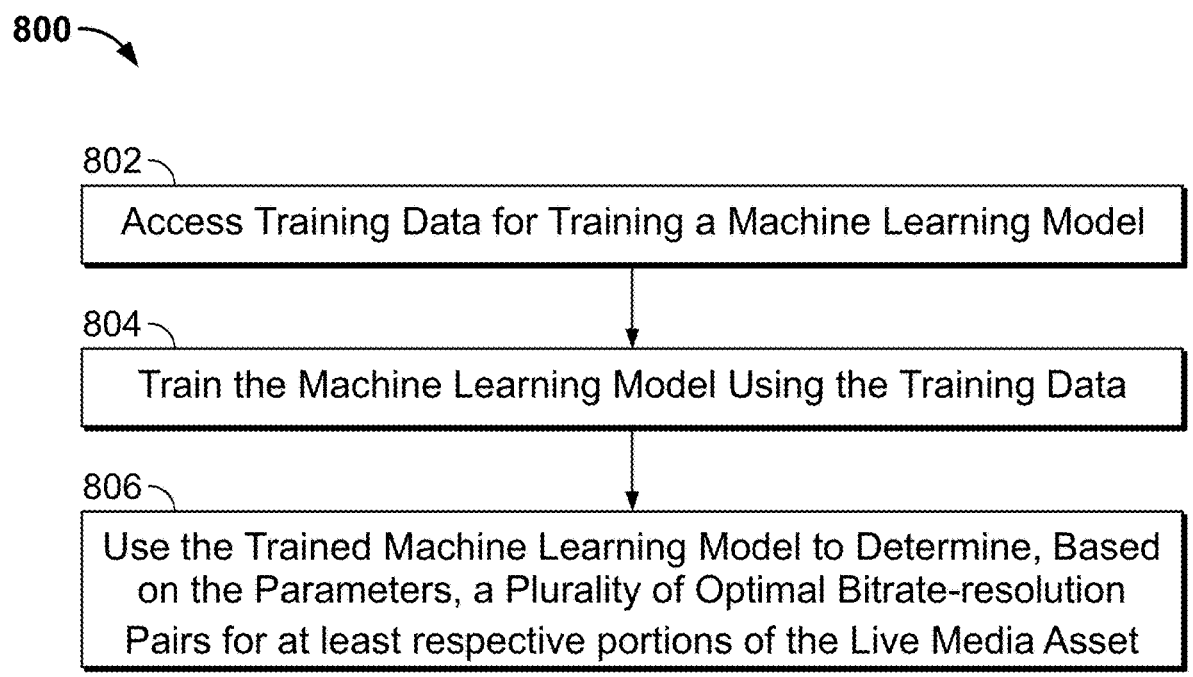
FIG. 8 is a flowchart of a detailed illustrative process for training a machine learning model and using the machine learning model to facilitate transcoding at least a portion of a media asset for an ABR streaming process, in accordance with some embodiments of this disclosure.

FIG. 8 is a flowchart of a detailed illustrative process 800 for training a machine learning model and using the machine learning model to facilitate transcoding of at least a portion of at least a portion of the media asset for an ABR streaming process, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead.

At 802, the ABR ladder generator system may access training data for training a machine learning model. For example, training data from encoded video dataset database 302 of FIG. 3A may be used to train machine learning model 306. In some embodiments, encoded video dataset database 302 may correspond to media content source 102 and/or server 104 and/or a database associated with server 104. In some embodiments, training data from encoded video dataset database 302 may be associated with any suitable number of media assets (or portions thereof) of any suitable format and may have various characteristics and be associated with various genres. In some embodiments, encoded video dataset database 302 may include a variety of genres of training content as well as a comprehensive combination of bitrates and resolutions. In some embodiments, encoded video dataset database 302 may include data associated with previously streamed live content and/or previously streamed non-live content.

At 804, the ABR ladder generator system may train the machine learning model using the training data accessed at 802. For example, the ABR ladder generator system may train the machine learning model (e.g., machine learning model 306 of FIG. 3A) using training data (e.g., stored at encoded video dataset database 302 of FIG. 3A) comprising a plurality of parameters (e.g., indicated at 304 of FIG. 3A)

for at least respective portions of plurality of media assets (and/or parameters for the media asset as a whole) and corresponding bitrate-resolution pairs (e.g., indicated at bitrate-resolution ladder 308 of FIG. 3A).

In some embodiments, training machine learning model 306 may be performed by way of supervised learning, and the training data may be suitably formatted and/or labeled (e.g., by human annotators or editors or otherwise labeled via a computer-implemented process) to indicate that particular bitrate-resolution ladder 308, corresponding to particular input training parameters 304, was previously determined to be optimal for such media asset or segments thereof. In some embodiments, machine learning model 306 may be trained by way of unsupervised learning, e.g., to recognize and learn patterns based on unlabeled data.

In some embodiments, input parameters 304 may include any suitable number and/or types of parameters, e.g., a quantization parameter (QP), bits per pixel, a number of slices or tiles or other regions used in encoding at least a portion of a media asset, a number of reference frames used in encoding at least a portion of a media asset, motion vectors used in encoding at least a portion of a media asset, or any other suitable encoding parameter or other parameter, or any combination thereof. In some embodiments, the parameters may include an indication of a genre of a media asset, or portions thereof, and/or any other suitable characteristics, or such genre or other characteristics may otherwise be input to machine learning model 306 with parameters 304.

At 806, the ABR ladder generator system may use the trained machine learning model (e.g., trained machine learning model 312) for predictive ABR ladder creation of optimal resolution per bitrate for each media asset (or portion(s) thereof) associated with an input to model 312, to facilitate real-time adaptive bitrate transcoding of such media asset, e.g., one or more portions of the media asset 106. For example, the trained machine learning model may be configured to accept as input the parameters of at least a portion of the ingested live media asset (e.g., one or more of parameters 310 of FIG. 3B) and output the plurality of optimal bitrate-resolution pairs for at least a portion of the ingested live media asset (e.g., media asset 106 of FIG. 3B) based on real-time processing of such input parameters. For example, 706 of FIG. 7 may be performed in a similar manner to 806 of FIG. 8. Thus, optimal bitrate-resolution ladder 314 output by trained machine learning model 312 may be provided to server 104 and/or edge servers 202 or 204 for use in transcoding at least a portion of an ingested media asset 106 in real time, e.g., in response to each request to view a media asset and/or during playing of segments thereof.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method performed by a computing medium, the computer-implemented method comprising:
ingesting at least a portion of a live media asset from a media content source;
performing, in real time, after ingesting the at least the portion of the live media asset:
determining parameters of the at least the portion of the ingested live media asset based at least in part on analyzing bitstream-level statistics ingested with the at least the portion of the ingested live media asset;
inputting the determined parameters into a machine learning model, wherein the machine learning model has been trained using training data comprising a plurality of parameters for at least respective portions of a plurality of media assets and corresponding bitrate-resolution pairs;
determining, via an output from the machine learning model, a plurality of optimal bitrate-resolution pairs for the at least the portion of the live media asset for transmission to at least one edge server;
determining a bandwidth of the computing medium and the at least one edge server, wherein the at least one edge server is different from the computing medium;
based at least in part on the bandwidth, determining a transcoding site to transcode the at least the portion of the live media asset, wherein the transcoding site corresponds to the computing medium or the at least one edge server; and
causing the at least the portion of the live media asset to be transcoded at the transcoding site based on the plurality of optimal bitrate-resolution pairs.

2. The method of claim 1, further comprising:
generating a bitstream comprising metadata, the metadata including the plurality of optimal bitrate-resolution pairs;
wherein causing the at least the portion of the live media asset to be transcoded comprises transmitting the bitstream from a central server to the at least one edge server, wherein the at least one edge server are configured to transcode the at least the portion of the live media asset based on the plurality of optimal bitrate-resolution pairs indicated in the metadata.

3. The method of claim 2, wherein:
the at least the portion of the live media asset is a segment of the live media asset, and the live media asset comprises a plurality of segments; and
the transmitted bitstream includes a single indication of the metadata for each respective segment of the plurality of segments.

4. The method of claim 1, wherein:
a central server performs the ingesting of the at least the portion of the live media asset from the media content source;
causing the at least the portion of the live media asset to be transcoded based on the plurality of optimal bitrate-resolution pairs comprises the central server transcoding the at least the portion of the live media asset; and
transmitting the transcoded at least a portion of the live media asset to the at least one edge server.

5. The method of claim 1,
wherein the trained machine learning model is configured to accept as input the parameters of the at least the portion of the ingested live media asset and output the plurality of optimal bitrate-resolution pairs for the at least the portion of the ingested live media asset, wherein the parameters of the training data include an indication of a genre for at least the respective portions of the plurality of media assets of the training data.

6. The method of claim 1, wherein determining parameters of the at least the portion of the live media asset comprises extracting scene and motion statistics from a bitstream corresponding to the at least the portion of the ingested live media asset.

7. The method of claim 1, wherein:
the at least the portion of the live media asset is a segment of the live media asset, and the live media asset comprises a plurality of segments; and
determining parameters of the at least the portion of the live media asset comprises determining parameters for at least one segment of the plurality of segments, wherein the parameters include a genre of the at least the portion of the live media asset or the at least one segment thereof.

8. The method of claim 1, wherein causing the at least the portion of the live media asset to be transcoded at the transcoding site based on the plurality of optimal bitrate-resolution pairs is performed in response to receiving a request from a client device for the at least the portion of the ingested live media asset.

9. The method of claim 1, wherein the at least the portion of the live media asset, as ingested, is encoded.

10. The method of claim 1, wherein the at least the portion of the live media asset, as ingested, is not encoded, and the method further comprises:
encoding the at least the portion of the ingested live media asset, wherein the parameters of the live media asset are determined based at least in part on performing the encoding.

11. A computer-implemented system comprising:
memory; and
a computing medium comprising control circuitry configured to:
ingest at least a portion of a live media asset from a media content source;
perform, in real time, after ingesting the at least the portion of the live media asset:
determine parameters of at least the portion of the ingested live media asset based at least in part on analyzing bitstream-level statistics ingested with the at least the portion of the ingested live media asset;
input the determined parameters into a machine learning model, wherein the machine learning model has been trained using training data comprising a plurality of parameters for at least respective portions of a plurality of media assets and corresponding bitrate-resolution pairs;
determine, via an output from the machine learning model, a plurality of optimal bitrate-resolution pairs for the at least the portion of the live media asset for transmission to at least one edge server,
determine a bandwidth of the computing medium and the at least one edge server, wherein the at least one edge server is different from the computing medium;
based at least in part on the bandwidth, determine a transcoding site to transcode the at least the portion of the live media asset, wherein the transcoding site corresponds to the computing medium or the at least one edge server; and cause the at least the portion of the live media asset to be transcoded at the transcoding site based on the plurality of optimal bitrate-resolution pairs.

12. The system of claim 11, wherein the system further comprises a central server and the at least one edge server, and the control circuitry is further configured to:
generate a bitstream comprising metadata, the metadata including the plurality of optimal bitrate-resolution pairs; and
cause the at least the portion of the live media asset to be transcoded by transmitting the bitstream from the central server to the at least one edge server, wherein the at least one edge server are configured to transcode the at least the portion of the live media asset based on the plurality of optimal bitrate-resolution pairs indicated in the metadata.

13. The system of claim 12, wherein:
the at least the portion of the live media asset is a segment of the live media asset, and the live media asset comprises a plurality of segments; and
the transmitted bitstream includes a single indication of the metadata for each respective segment of the plurality of segments.

14. The system of claim 11, wherein the system further comprises a central server, and the central server is configured to:
perform the ingesting of the at least the portion of the live media asset from the media content source;
cause the at least the portion of the live media asset to be transcoded based on the plurality of optimal bitrate-resolution pairs asset; and
transmit the transcoded at least a portion of the live media asset to the at least one edge server.

15. The system of claim 11,
wherein the trained machine learning model is configured to accept as input the parameters of the at least the portion of the ingested live media asset and output the plurality of optimal bitrate-resolution pairs for the at least the portion of the ingested live media asset, wherein the parameters of the training data include an indication of a genre for at least the respective portions of the plurality of media assets of the training data.

16. The system of claim 11, wherein the control circuitry is configured to determine the parameters of the at least the portion of the live media asset by extracting scene and motion statistics from a bitstream corresponding to the at least the portion of the live media asset.

17. The system of claim 11, wherein:
the at least the portion of the live media asset is a segment of the live media asset, and the live media asset comprises a plurality of segments; and
the control circuitry is configured to determine parameters of the at least the portion of the live media asset by determining parameters for at least one segment of the plurality of segments, wherein the parameters include a genre of the at least the portion of the live media asset or the at least one segment thereof.

18. The system of claim 11, wherein the control circuitry is configured to cause the at least the portion of the live media asset to be transcoded at the transcoding site based on the plurality of optimal bitrate-resolution pairs in response to receiving a request from a client device for the at least the portion of the live media asset.

19. The system of claim 11, wherein the at least the portion of the live media asset, as ingested, is encoded.

20. The system of claim 11, wherein the at least the portion of the live media asset, as ingested, is not encoded, and the control circuitry is further configured to:
- encode the at least the portion of the ingested live media asset; and
- determine the parameters of the at least the portion of the live media asset based at least in part on performing the encoding.

21. The method of claim 9, wherein the determined parameters of the at least the portion of the live media asset comprise at least one of quantization parameters (QP), bits per pixel, a number of regions used for encoding the at least the portion of the live media asset, a number of reference frames used for encoding the at least the portion of the live media asset, or motion vectors used in encoding the live the at least the portion of the live media asset.

22. The system of claim 11, wherein the determined parameters of the at least the portion of the live media asset may comprise at least one of quantization parameters (QP), bits per pixel, a number of regions used for encoding the at least the portion of the live media asset, a number of reference frames used for encoding the at least the portion of the live media asset, and motion vectors used in encoding the live the at least the portion of the live media asset.

* * * * *